United States Patent [19]

Watanabe

[11] Patent Number: 4,560,572
[45] Date of Patent: Dec. 24, 1985

[54] CITRUS FRUIT PROCESSING AND FOOD PRODUCT

[76] Inventor: Sharkey Watanabe, 31 Deer Creek, Irvine, Calif. 92714

[21] Appl. No.: 544,599

[22] Filed: Oct. 24, 1983

Related U.S. Application Data

[63] Continuation-in-part of Ser. No. 294,104, Aug. 19, 1981, abandoned.

[51] Int. Cl.⁴ .......................... A23L 1/212; A23P 1/00
[52] U.S. Cl. ...................................... 426/616; 99/537; 241/74; 241/46.11; 366/300; 426/481; 426/519
[58] Field of Search ............... 426/616, 478, 481, 519; 99/348, 537; 366/297, 300; 241/74, 46.11, 46.17

[56] References Cited

U.S. PATENT DOCUMENTS

| 496,814 | 5/1893 | Claflin, Jr. ........................... 162/234 |
| 1,843,467 | 2/1932 | Traquair et al. .................... 162/234 |

FOREIGN PATENT DOCUMENTS

47-22254 6/1972 Japan ................................. 426/616

*Primary Examiner*—George Yeung
*Attorney, Agent, or Firm*—Benoit Law Corporation

[57] ABSTRACT

Individually separated juice-bearing vesicles are provided by processing citrus fruit having clusters of juice-bearing vesicles within natural enclosures. Extra-gastric digestion may be employed to expose these clusters. A slurry is then formed including exposed clusters of juice-bearing citrus fruit vesicles, and such slurry is propelled in countervailing first and second streams until the clusters are broken up into discrete juice-bearing vesicles.

8 Claims, 4 Drawing Figures

CITRUS FRUIT PROCESSING AND FOOD PRODUCT

BACKGROUND OF THE INVENTION

1. Cross-Reference

This is a continuation-in-part of my copending patent application Ser. No. 06/294,104, filed Aug. 19, 1981 for Citrus Fruit Processing and Food Product, now abandoned, and herewith incorporated by reference herein.

2. Field of the Invention

The subject invention relates to food processing, to methods and apparatus for processing citrus fruit, to methods and apparatus for providing individually separated juice-bearing vesicles, and to food products comprising such individually separated juice-bearing vesicles themselves.

3. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

By way of example, grapefruits, oranges, tangerines, mandarins and lemons belong to the family of citrus fruit having clusters of fruit-bearing vesicles within natural organic enclosures.

While parts of such fruits are edible, their human consumption involves or engenders several problems.

For instance, when such fruits are sold or delivered whole to the consumer, he or she has to do most of the processing in order to get at the edible parts. In the case of grapefruit, for instance, the consumer or a cook or waiter at the consumer's site typically will have to execute an equatorial cut through the grapefruit, exposing the grapefruit segments in the resulting halves. To facilitate consumption, further cuts have to be executed along the internal septa and locular membranes and also hemispherically along or through the mesocarp.

This then enables the consumer to scoop clusters of juice sacs and related matter out of the segments with the aid of a spoon.

Many consumers do not have the requisite dexterity for a successful execution of these operations. As a result, much of the fruit is wasted on the one hand, and seeds or other bitter or undesirable parts find their way into the consumer's alimentary tract. Also, the inadvertent squirting of juice into a breakfast partner's eye is not an infrequent occurrence in this kind of consumption. Moreover, this kind of consumption practically can only be conveniently performed from a sitting position.

In the case of other wholly delivered citrus fruits, the consumer typically has to remove the peel thereof, comprising the exocarp and all but the inner portion of the mesocarp. In some citrus fruits, such as oranges, the peel is not always easily removed, be it because of a tough mesocarp or due to another condition Peeling then becomes a chore, and bitter peel residues or endocarpous tissues tend to find a way into the user's alimentary tract.

The user then has to break down the peeled fruit into its segments for oral consumption. Unless the fruit happens to be of a type having easily torn mesocarpous tissues between adjacent segments, a further chore will have to be performed at this juncture. Also, many people object to swallowing locular membranes, septa and seeds at this point, requiring their removal prior to consumption, or at least ejection out of the oral cavity, sometimes accompanied by an embarrassing display of questionable eating habits.

Processing citrus fruits in a blender does not really avoid these problems, since the fruit still has to be peeled and to a large extent cleaned, if a consumption of bitter pericarpous tissue and similarly distasteful parts is to be avoided.

In consequence, a large if not major portion of the citrus crop is squeezed to cause vacuolated cells inside the juice sacs of the fruit to release the fruit juice. If such operation is performed by the consumer, the entire remainder of the fruit is wasted and even the juice content is not entirely removed from the fruit.

Commercial juicing operations typically achieve a somewhat better efficiency, but still foreclose valuable nutritional parts of the fruits to human consumption.

Juice sacs have been recognized as edible portion of citrus fruits in the past, and teasing apart of fruit sacs has been reported, as may be seen from the book THE CITRUS INDUSTRY, Vol. II, by Walter Reuther et al (University of California, rev. ed. 1968), p. 15. However, such known operations would be very inefficient, making poor use of the food potential of the fruit.

Proposed commercial operations for separating cell sacs have induced improper separation or crushing thereof. For instance, U.S. Pat. No. 2,510,679, by John A. Bruce, issued June 6, 1950, for citrus fruit processing proposed using a deceller including rotating wire loops for disintegrating everted, cored citrus fruits. As the text of that patent itself concedes, such a deceller operation at best resulted in a mixture of juice, whole cells and ruptured cells.

Recognizing this problem, a subsequent proposal apparent from U.S. Pat. No. 3,246,993, by R. C. Webster et al, issued April 19, 1966, suggests the immersion of the fruit into an extremely cold liquid, such as liquified nitrous oxide, carbon dioxide, argon or helium, having a temperature lower than 100° F. below zero in order to shatter the fruit by thermal shock upon withdrawal into an ambient atmosphere at room temperature. Even though that supposed shattering phenomenon was not understood, it was believed possible to separate discrete juice cells by agitation of the shattered sections.

In particular, it was proposed that such agitation or separation be carried out by passing chunks of adhering cells on a belt under resilient rollers or between such rollers, thereby detaching juice cells from one another and also from the membranes covering the sections.

It is difficult to conceive that such a procedure relying on dangerous cryogens could be commercially feasible, justifying the large expenditure of energy in the liquifaction of any of the suggested gases and the special precautionary and equipment measures for their safe handling and procedures. Yet without such exploits into cryogenics, the suggested agitation method would be completely useless, in that the proposed agitation and separation rollers, even if resilient, would, of course, crush any fruit cells that were not deeply frozen and therefore thoroughly rigid.

A subsequent proposal, apparent from the Japanese Patent Publication No. 47-22254, by Kagome KK., avoids cryogenics, but suggests use of a centrifuge for separating segment cells from which the segment skin has been removed by conventional acid-alkaline treatment. As apparent from the text of that patent publication, this separation procedure was suggested by the fact that centrifugation has been used in order to remove orange juice from the pulp of the fruit. Spinning in a centrifuge as proposed by that patent publication is, however, not a suitable and effective method for separating clusters of juice sacs into discrete juice cells, inasmuch as a centrifuge is a machine for whirling fluids rapidly to separate substances of different densities by centrifugal force, rather than for separating particles or cells of the same kind.

Even if it would be possible to separate juice cells by high spins, the resulting forces would at the same time tear the cell sacks. For the same reasons, agitators of the type used in other industries, such as those apparent from U.S. Pat. No. 496,814, by G. D. Claflin, issued May 2, 1893, for apparatus for the continuous preparation of paper stock, and U.S. Pat. No. 1,843,467, by J. Traquair et al, issued Feb. 2, 1932, for paper manufacture, are of little use to a solution of the problem at hand, since wood chips used in paper manufacture and other materials handled by such prior agitators are much less delicate than the easily ruptured citrus fruit cell sacs or vesicles.

Accordingly, U.S. Pat. No. 4,139,651, by Tadashi Sekiguchi, issued Feb. 13, 1979, for a method of removing citrus fruit pulp segment membranes with alkali and phosphate solutions, omits mentioning of a method or apparatus for breaking up the juice cell clusters of the exposed segments into discrete cell sacs or vesicles.

However, without impeccably operating cell sac operating systems, the above mentioned methods and apparatus inherently are of only limited practical use and will not provide a superior discrete juice cell product.

In a similar vein, existing proposals of reciprocating rotary beaters fail to use such beater for cell separation. In this respect, U.S. Pat. No. 1,282,148, by P. Tripke, issued Oct. 22, 1918, for a combined egg separator and beater, uses a specially shaped and apertured lid for separating the egg white from the heavier yolk, and employs its reciprocating beaters only for beating the separated egg white.

If, on the other hand, both the yolk and the egg white were subjected to those reciprocating beaters, then the result would not be any separation thereof, but rather a thorough breaking up of the egg yolk and admixture thereof with the egg white.

U.S. Pat. No. 3,955,802, by N. A. de Bruyne, issued May 11, 1976, for an orbital oscillating stirrer, refers to various stirrer systems, mentioning impartation of motion to a liquid so that it moves in a vertical direction and at the same time in a horizontal direction, and also mentions use of the disclosed stirrer with suspension cell culture. However, no operative cell separation system is mentioned therein.

SUMMARY OF THE INVENTION

It is a general object of this invention to overcome the disadvantages and meet the needs expressed or implicit in the above disclosure statement or in other parts hereof.

It is a germane object of this invention to provide for a better use of the nutritional value of citrus fruit.

It is a related object of this invention to free the consumer from the chores involved in traditional citrus fruit consumption on the one hand, and to provide the consumer with nutrition from citrus fruits above and beyond their mere juice.

It is also an object of this invention to provide improved methods and apparatus for processing citrus fruit, to provide improved methods and apparatus for providing individually separated juice-bearing vesicles or fruit sacs, and to provide improved food products comprising individually separated juice-bearing vesicles.

It is a related object of this invention to provide improved methods and apparatus for breaking up clusters of citrus fruit vesicles into discrete juice-bearing vesicles at relatively low energy cost, without rupture of the vesicle walls or other damage to the vesicles, or the environment.

Other objects will become apparent in the further course of this disclosure.

From one aspect thereof, the subject invention resides in a method of processing exposed clusters of juice-bearing citrus fruit vesicles, comprising, in combination, the steps of forming a slurry including these clusters, and propelling such slurry in countervailing first and second streams until the clusters are broken up into discrete juice-bearing vesicles.

The subject invention resides also in discrete juice-bearing vesicles provided by the above mentioned or any other method of the subject invention or embodiments thereof.

The subject invention resides also in apparatus for processing exposed clusters of juice-bearing citrus fruit vesicles, comprising, in combination, means for forming a slurry including these clusters, a vessel having an inlet for receiving such slurry, means in the vessel for propelling the slurry in countervailing first and second streams until the clusters are broken up into discrete juice-bearing vesicles, first outlet means for the slurry, and separate second outlet means for the discrete juice-bearing vesicles.

Other aspects of the invention will become apparent in the further course of this disclosure, and no limitation whatever is intended by this summary of the invention in any respect.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
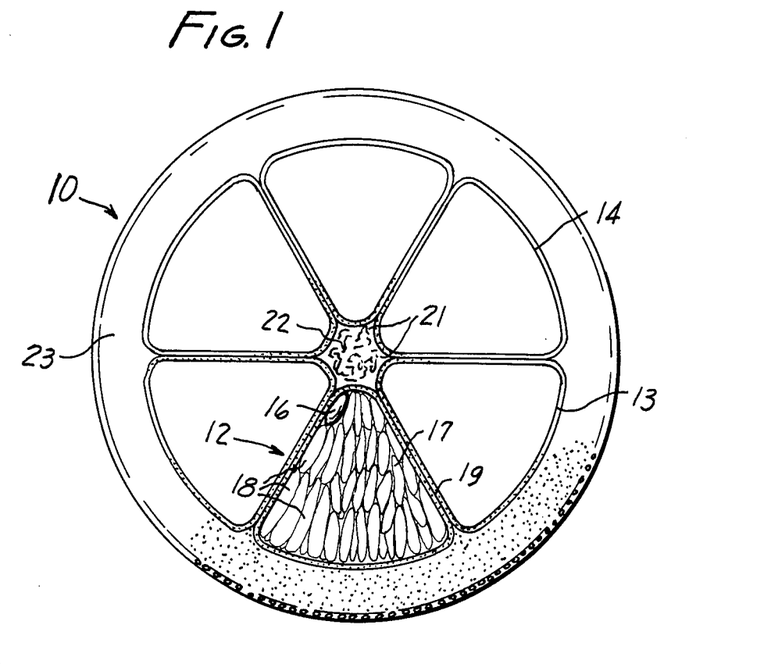
FIG. 1 is a somewhat stylized equatorial cross-section through a citrus fruit.

The citrus fruit 10 shown in FIG. 1 has been represented in a somewhat stylized form for the purpose of illustration and explanation, as distinguished from a display of anatomical accuracy and esoteric detail.

The fruit 10 may be considered divided into a number of segments 12, 13, 14, etc., only six of which have been shown in FIG. 1 for the purpose of illustration. The segments contain seeds 16 and clusters 17 of juice sacks or juice-bearing vesicles 18 enclosed in locular membranes 19.

Septa 21 radiate from a central stem 22 in between adjacent locules or segments 12.

The citrus fruit 10 has a peel 23 enclosing the segments 12, 13, 14, etc., and the other inner portions of the fruit. In this respect, the portion of the fruit exterior to the segments or locules may be divided into the exocarp or flavedo, the endocarp and the mesocarp or albedo. The exocarp is composed of a cuticle-covered epidermis and compactly arranged parenchyma cells adjacent to it. The endocarp is the inner side of the pericarp and a portion of the locular membrane. It is composed of the inner epidermis and several layers of compactly arranged parenchyma cells adjacent to it. The mesocarp occurs between the exocarp and the endocarp.

The peel 23 may be considered as consisting of the exocarp and all but the inner portion of the mesocarp.

Figure 2:
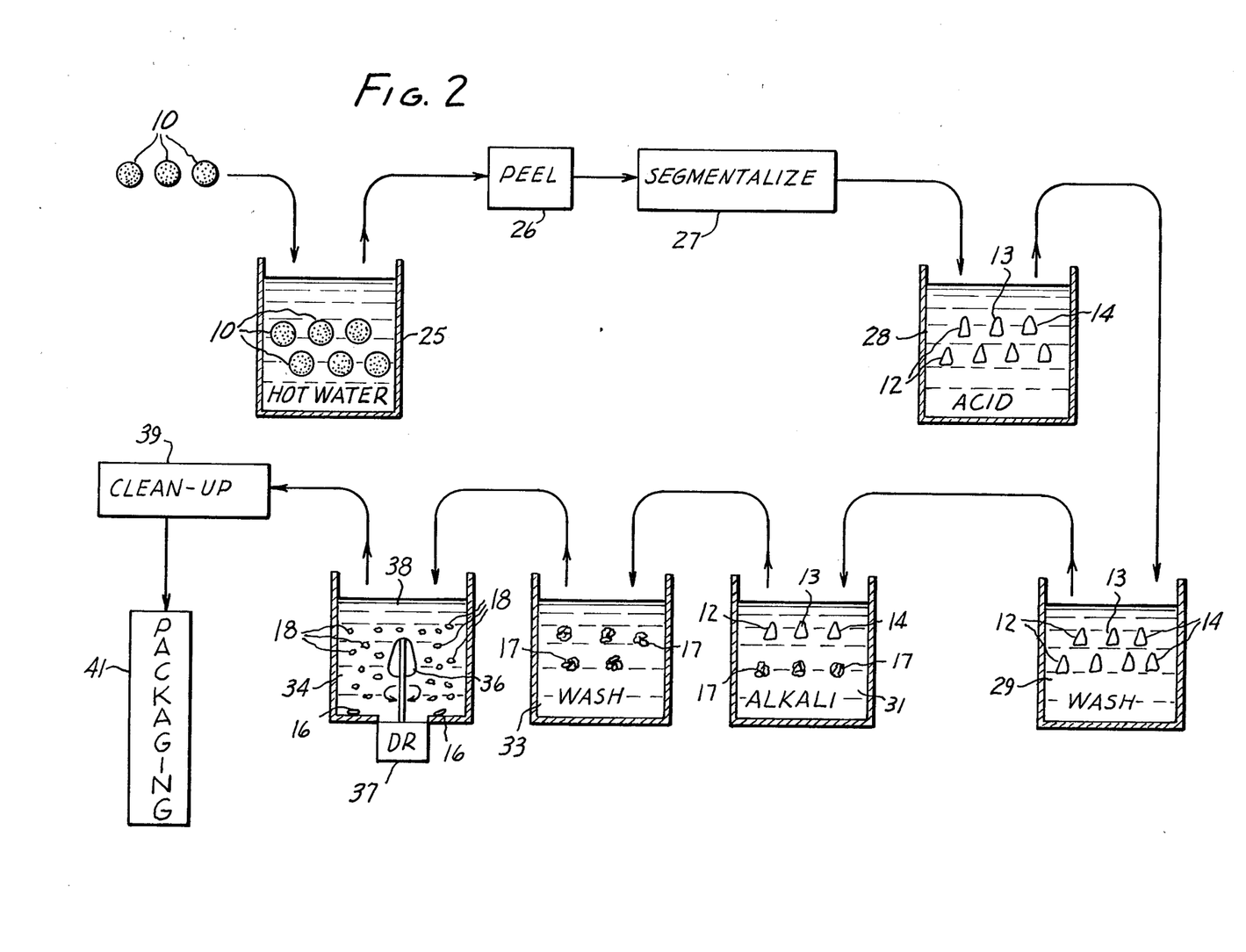
FIG. 2 is a flowsheet and diagrammatic showing of a method and an apparatus for processing citrus fruit into individually separated juice-bearing vesicles according to a preferred embodiment of the subject invention.

According to the preferred embodiment of the subject invention illustrated in FIG. 2, fresh citrus fruits 10, such as, by way of example, grapefruits, oranges, tangerines, mandarins, lemons and the like, are introduced into a steam or hot water bath 25 for a softening of the outside skin or peel 23. By way of example, the water in the bath 25 may have a temperature of about 90° C. to 95° C., and the fruits 10 may stay in the hot water bath 25 for about three minutes, until their outside skin has become sufficiently soft for removal by hand or machine.

In this respect, the best mode presently contemplated for carrying the subject invention into effect prefers peeling by hand over peeling by machine, so as to avoid possible damage to the juice-bearing vesicles or cell sacks. The hot water-treated fruits 10 are thus peeled at 26. The resulting inner portion or core of each fruit is then segmentalized at 27. This involves separating the inner part of the fruit into its segments 12, 13, 14, etc. This again is preferably done by hand, so as to avoid possible damage to the fruit-bearing vesicles within their natural organic enclosures. In practice, the segmentalization step at 27 may also include removal of septal remnants, mesocarpous tissue and naturally occurring strings from the backs and other portions of the segments. If desired, seeds may be squeezed out or otherwise removed from the segment at that juncture, as necessary or desired.

The resulting cleaned sections comprise clusters 17 of juice-bearing vesicles 18 within locular membranes 19 or other natural organic enclosures. These cleaned segments are then introduced into an acid bath 28. By way of example, and not by way of limitation, the acid bath may contain hydrochloric acid (HCl). Also by way of example, the hydrochloric acid may be in a 0.2 to 0.6% aqueous solution. It may be noted in this respect that the bath 28 has an acid content similar to gastric juice.

By way of example, the cleaned segments may remain in the acid bath for about fifteen to twenty minutes. In the acid bath 28, pectin is dissolved from the cleaned segments.

After the acid bath 28, the segments are washed in a water bath 29 to wash away chemical residues therefrom. Running water may, for instance, be used for that purpose.

The washed segments are transferred from the bath 29 to an alkali bath 31 in order to dissolve the locular membrane, outside skin or other natural organic enclosure from each segment 12, 13, 14, etc.

By way of example and not by way of limitation, the bath 31 may include caustic alkali (NaOH). Also by way of example, the caustic alkali in the bath 31 may be present in a 0.6 to 1% aqueous solution. The segments or their contents may remain in the alkali bath 31 for about 15 to 20 minutes, until their locular membranes or other natural organic enclosures 19 have been dissolved or removed therefrom.

The alkali bath 31 preferably is heated for this purpose. By way of example, the alkali bath 31 may have a temperature of about 40° C. to 50° C.

After dissolution or removal of the locular membrane or other natural organic enclosure 19 from the segments 12, 13, 14, etc., the clusters 17 of juice-bearing vesicles 18 are exposed.

After their exposure, the clusters 17 of juice-bearing vesicles are transferred to a bath 33 for the purpose of removing alkali residue therefrom. By way of example, running water may be used for this purpose for a longer period of time, such as about six to twelve hours.

The thoroughly washed clusters 17 of juice-bearing vesicles are transferred to a washing machine 34 or other means for breaking up the clusters 17 into individually separated juice-bearing vesicles by mechanical agitation. By way of example, a reciprocating agitator 36, driven by a reciprocating motor or drive 37, may be employed for that purpose. The mechanical agitation in the apparatus 34 is at the same time vigorous, but sufficiently gentle so as to avoid any significant damage to the juice-bearing vesicles or juice sacs 18.

In the washing machine or agitating apparatus 34, which may be filled with water, individually separated juice-bearing vesicles or juice sacs 18 will come up to the surface at 38, while big-size seeds 16, unseparated cell sacs and undesirable components will gravitate to the bottom of the machine, where they can be removed from time to time.

The individually separated juice-bearing vesicles 18 may be skimmed off the surface region of the water in the machine 34 and may be subjected to a final clean-up operation 39. For instance, small seeds, dust and other particles may be removed from the juice-bearing vesicles 18. For this purpose, the juice-bearing vesicles 18 removed from the machine 34 may be placed onto a conveyor belt, from which small seeds and similar contaminants may be picked.

As indicated at 41, the cleaned individually separated juice-bearing vesicles 18 may then be subjected to packaging. For instance, the vesicles 18 may be filled into tin cans into which a suitable syrup or sugar solution is also poured, in order to fill up to the top of the container.

Prototype operations have indicated that the process of the illustrated preferred embodiment of the subject invention has a very high efficiency, providing for each fruit individually separated juice-bearing vesicles or juice sacs 18 corresponding in weight to about one-third the weight of the fresh fruit. The resulting nutritional value is thus much higher than anything that could be achieved by juicing of the fruit.

The resulting individually separated fruit-bearing vesicles may be employed in various drinks. Their size and consistency is such that they are easily swallowed by the consumer. Larger vesicles may be chewed and then swallowed, as the consumer desires.

Considering the preferred embodiment of the subject invention illustrated in FIG. 2, it is seen that the methods and apparatus therein shown, effectively subject the locular membranes or other natural organic enclosure 19 of the clusters 17 of juice-bearing vesicles 18 to extra-gastric digestion until the clusters 17 have been exposed or isolated, as shown at 31 in FIG. 2. Thereafter, as indicated at 34, the clusters 17 are broken up into individually separated juice-bearinq vesicles 18 by reciprocal mechanical agitation.

All the steps shown in FIG. 2 may be carried out at the fruit processor, remotely from the consumer. By effecting the locular membrane or section enclosure digestion at the site of the food processor, as distinguished from the consumer, all the initially mentioned, cumbersome fruit processing steps on the part of the consumer are eliminated. However, unlike in the case of prior-art juicing operations, the consumer still gets the benefit of almost all edible and nutritional contents of the fruit, comprising not only the valuable and tasty juice, but also the vitamin-rich, fibrous and highly nutritional juice sacs or vesicles, in an easily consumable and readily digestible form.

Also, the methods and means of the subject invention preserve the shape, integrity and quality of the individually separated juice-bearing vesicles in a manner and to an extent not heretofore achieved.

According to a preferred embodiment of the subject invention, illustrated by way of example in FIG. 2, the extra-gastric digestion of the enclosures 19 is carried out in an alkali bath, such as the caustic alkali bath indicated at 31 and more fully described above.

According to a preferred embodiment, the enclosures 19 are subjected to an acid bath, such as the hydrochloric acid bath indicated at 28 and more fully described above.

In particular, the enclosures 19 may be subjected to an acid bath, such as a hydrochloric acid bath, and may then be subjected to an alkali bath, such as the mentioned caustic alkali bath, until the enclosures 19 have been removed or digested, and the clusters 17 are capable of being broken up into individual juice-bearing vesicles 18 by reciprocal mechanical agitation.

In principle, the clusters 17 could be shipped after washing and cleaning and could be broken up into individual juice-bearing vesicles 18 after shipment of the clusters 17. However, the presently perceived best mode of carrying the invention into effect prefers separation of the clusters 17 into individual juice-bearing vesicles 18, and cleanup and packaging of such individual vesicles, as indicated at 39 and 41 in FIG. 2, at the main processing center, prior to shipment thereof.

Figure 3:
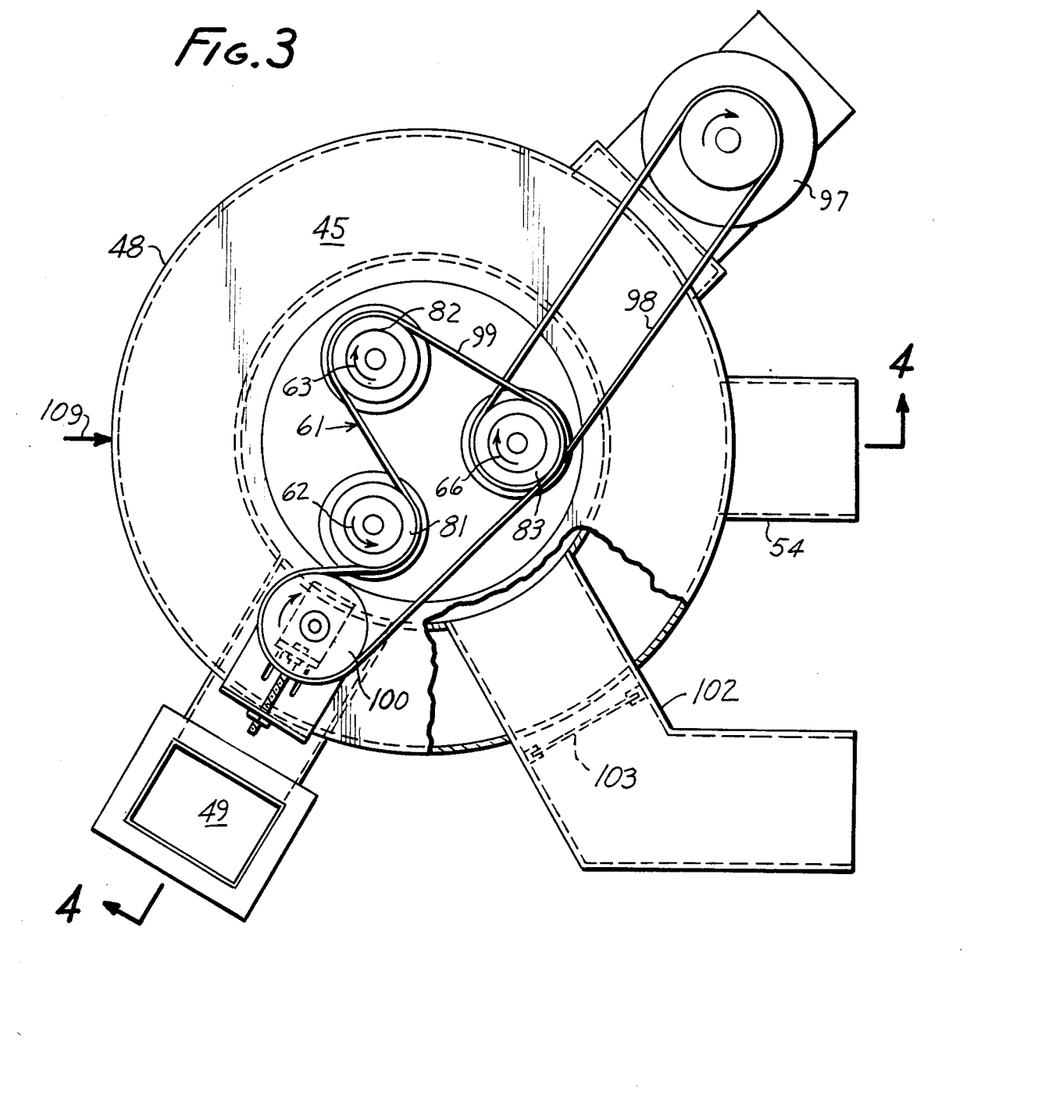
FIG. 3 is a top view of an apparatus for processing exposed clusters of juice-bearing citrus fruit vesicles, according to a preferred embodiment of the subject invention.
Figure 4:
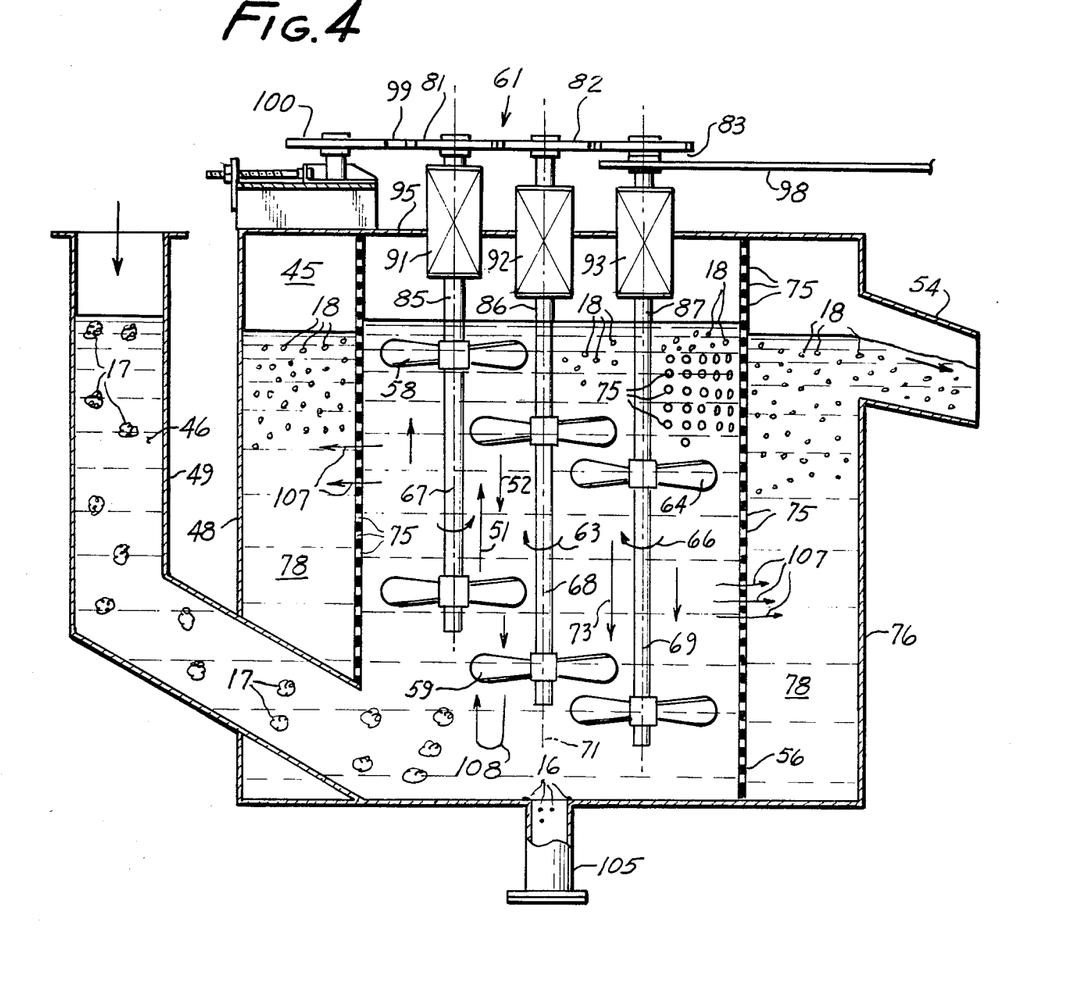
FIG. 4 is a section, taken approximately on the lines 4—4 in FIG. 3.

FIGS. 3 and 4 show a system 45 for processing exposed clusters 17 of juice-bearing citrus fruit vesicles 18. The bath 33 shown in FIG. 2 or other means may be employed for forming a slurry 46 including the clusters 17 of juice-bearing citrus fruit vesicles. While the methods and apparatus so far disclosed with respect to FIGS. 1 and 2 up to the bath 33 may also in conjunction with FIGS. 3 and 4 be employed for preparing the clusters 17, the aspect of the invention disclosed with the aid of FIGS. 3 and 4 is not so limited. Rather, any method and apparatus which will provide the clusters 17 in a slurry 46 may be employed for supplying an input of the system shown in FIGS. 3 and 4.

The system or processing apparatus 45 has a vessel 48 having an inlet 49 for receiving the slurry 46 carrying the clusters 17. Inside the vessel 48, the slurry 46 with entrained clusters 17 is propelled in countervailing first and second streams 51 and 52 until the clusters 17 are broken up into discrete juice-bearing vesicles 18. The vessel also has an outlet 54 for discharging the discrete juice-bearing vesicles 18 from the vessel 48. To accomplish this function, the illustrated preferred embodiment uses a screen 56 in the vessel, permitting only discrete vesicles 18 to reach the outlet 54, while holding clusters 17 back from leaving the vessel through the outlet 54.

As a common feature, the embodiments shown in FIGS. 2 to 4 employ bladed agitators for propelling the slurry in the vessel.

For instance, the embodiment of FIG. 2 uses a bladed agitator 36 reciprocated by the drive 37 in the direction of the two countervailing arrows shown in FIG. 2 between the agitator blades and the drive 37. In this manner, the slurry in the apparatus 34 of FIG. 2 is alternatingly propelled in countervailing first and second streams, indicated by the latter countervailing arrows in FIG. 2. As a result, the clusters 17 transferred from the tank or bath 33 are broken up into discrete juice-bearing vesicles 18, as described above.

According to the preferred embodiment shown in FIGS. 3 and 4, propeller means are employed in the vessel 48 In particular, the means for propelling the slurry 46 include first and second propeller means 58 and 59 and a drive 61 for rotating the first propeller means in a first sense 62 and the second propeller means 59 in an opposite second sense of rotation 63.

According to an embodiment shown in FIGS. 3 and 4, third propeller means 64 are provided for propelling the slurry 46, with the drive 61 rotating the third propeller means 64 in one of the first and second senses, such as in the second sense, as indicated by arrows 66.

The propellers 58, 59 and 64 are mounted in the illustrated embodiment of FIGS. 3 and 4 for rotation about axes 67, 68 and 69 extending parallel to a longitudinal axis 71 of the vessel 48.

It may be said that the embodiments of FIGS. 2 to 4 subject the slurry 46 to reciprocating agitation. The propelling means 36, 58, 59 or 64 propel the slurry 46 selectively in countervailing first and second directions. As indicated by the opposed arrows below the bladed agitator 36 in FIG. 2, the slurry in the vessel 34 is subjected alternatingly to movement in a first direction and countervailing movement in a second direction.

The illustrated preferred embodiment according to FIGS. 4 and 5 simultaneously generates countervailing first and second streams 51 and 52 in the slurry 46.

The first propeller means 58 generates the first stream 51 in a first part of the vessel, and the second propeller means 59 generates the second stream 52 in a second part of the vessel 48. The third propeller means 64 in the illustrated embodiment of FIGS. 3 and 4 propels the slurry 46 in a third stream 73 countervailing one of the first and second streams 51 and 52.

The illustrated preferred embodiment of FIGS. 3 and 4 thus includes propelling means for circulating the slurry 46 at least through countervailing first and second streams 51 and 52 to eject discrete juice-bearing vesicles 18 therefrom. In order to remove such discrete vesicles 18 from the circulating slurry, the outlet means 54 are provided with apertures 75 in a wall 56 of the vessel 48. According to the illustrated preferred embodiment of the invention, such wall 56 is a screen having a multitude of apertures 75 all around the propeller means 58, 59 and 64.

The solid outer wall 76 and the apertured inner wall or screen 56 jointly form a jacket 78 about the central slurry propelling space and may be concentric for that purpose.

The drive 61 has pulleys 81, 82 and 83 mounted on shafts 85, 86 and 87 extending through bearings 91, 92 and 93, for rotating the propeller means 58, 59 and 64. The bearings 91 to 93 extend through a top flange or plate 95 of the vessel 48.

One of the pulleys, such as the pulley 83, is driven from a motor 97 via a belt transmission 98. The other pulleys 81 and 82 may then be driven via a further transmission belt 99, served by an adjustable belt tensioner 100. A similar belt tensioner (not shown) may be employed at the belt transmission 98. By way of example, a variable speed electric motor may be employed at 97.

The illustrated vessel 48 also has a second outlet 102 for a removal, from time to time, of pulp and other debris that may accumulate inside the hollow-cylindrical screen 56. To this end, the second outlet 102 extends through the screen 56 into the central chamber occupied by propeller means 58, 59 and 64. A gate 103 is located in the second outlet 102 for closing the same during normal operation of the system. The gate 103 may be opened from time to time to release or remove pulp or other congestion from the central chamber of the vessel.

A normally closed third or further outlet 105 is located at the bottom of the vessel 48 for cleaning purposes, including a removal, from time to time, of seeds and other sediments or debris. A normally closed valve (not shown) may be used for opening the third outlet 105 from time to time and water or another cleaning fluid may then be flushed through the tank or vessel 48 for a thorough cleaning thereof.

When in operation, the propeller means 58, 59 and 64 establish in the slurry 46 not only the largely axial countervailing streams 51, 52 and 73 inside the cylindrical screen 56, but impose on the slurry also radial vectors 107 driving separated discrete vesicles through the apertures 75 in the screen 56 into the annular jacket 78 for exit through the first outlet 54 along with water or other liquid received through the inlet 49 in the slurry 46. Also, bent streams, such as the direction reversal stream 108, are established in the slurry inside the vessel or screen.

In the vessel 48, the slurry 46 is subjected to vigorous churning, reaching through the screen 56 into the outer jacket 78 for an efficient and reliable separation and isolation of discrete vesicles 18 from the clusters 17 in the slurry. The speed of the propeller means may be adjusted so that no injury of the individual vesicles takes place while the countervailing and the radial streams are established for an effective separation thereof.

Details of construction of the vessel 48 may easily be adapted to an optimal operation of the system 45. For instance, the lateral inlets and outlets may be shifted in design until the best possible arrangement is achieved for a particular purpose.

By way of example, in a prototype of the illustrated vessel 45, the inlet 49, by way of alternative, was shifted to a position indicated in FIG. 3 by an arrow 109, whereby the slurry 46 entered the action space in the screen 56 in between the counterrotating propeller means 58 and 59. Also by way of alternative, the positions of the first and second outlets 54 and 102 were reversed relative to their positions shown in FIG. 3, whereby the outlet of separated vesicles 18 took place adjacent a space between the first and second propeller means 58 and 64. Excellent results have been achieved in this manner in separating discrete vesicles from, for instance, oranges.

While the separation of the fruit 10 into segments has been mentioned above, it has been found that the methods and apparatus of the subject invention permit processing of whole fruits in the acid and/or alkali baths. Even the agitation herein disclosed is effective enough to break up clusters or lumps stemming from whole fruit, while being at the same time sufficiently gentle to derive the vesicles 18 without rupture of their juice-containing walls.

The separated vesicles 18 may be further processed and packaged as shown, for instance, at 39 and 41 in FIG. 2 or as otherwise mentioned above.

The subject invention meets all of its initially stated objectives and provides discrete juice-bearing vesicles at relatively low energy cost, without rupture of vesicle walls or other damage to the vesicles or the environment.

The subject extensive disclosure will suggest or render apparent to those skilled in the art various modifications and variations within the spirit and scope of the subject invention or equivalents thereof.

I claim:

1. In a method of processing exposed clusters of juice-bearing citrus fruit vesicles, the improvement comprising in combination the steps of:
   forming a slurry including said clusters; and
   propelling said slurry in countervailing first and second streams until said clusters are broken up into discrete juice-bearing vesicles.

2. A method as claimed in claim.1, wherein:
   said propelling includes subjecting said slurry to reciprocating agitation.

3. A method as claimed in claim 1, wherein:
   said propelling includes propelling said slurry selectively in countervailing first and second directions.

4. A method as claimed in claim 1, wherein:
   said propelling includes subjecting said slurry alternatingly to movement in a first direction and countervailing movement in a second direction.

5. A method as claimed in claim 1, wherein:
   said propelling includes simultaneously generating said first and second streams in said slurry.

6. A method as claimed in claim 1, wherein:
   said propelling includes generating said first stream in a first part of said slurry and generating said second stream in a second part of said slurry adjacent said first part.

7. A method as claimed in claim 1, including the step of:

propelling said slurry in a third stream countervailing one of said first and second streams.

8. A method as claimed in claim 1, including the steps of:

circulating said slurry through said first and second streams; and removing discrete juice-bearing vesicles from said circulating slurry.

* * * * *